United States Patent
Ko et al.

(10) Patent No.: US 8,205,226 B2
(45) Date of Patent: Jun. 19, 2012

(54) SYSTEM AND METHOD OF DYNAMICALLY ALLOCATING ADVERTISEMENT ACCORDING TO AUDIENCE RATING

(75) Inventors: Young-goo Ko, Anyang-si (KR); Sang-sun Choi, Suwon-si (KR); Jeong-ja Kim, Suwon-si (KR); Sie-kyung Jang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 684 days.

(21) Appl. No.: 11/650,499

(22) Filed: Jan. 8, 2007

(65) Prior Publication Data

US 2007/0169145 A1 Jul. 19, 2007

(30) Foreign Application Priority Data

Jan. 19, 2006 (KR) .................. 10-2006-0005951

(51) Int. Cl.
*H04H 60/33* (2008.01)
*H04H 20/14* (2008.01)
*H04H 60/29* (2008.01)
*H04N 7/10* (2006.01)
*H04N 7/025* (2006.01)

(52) U.S. Cl. .................. 725/34; 725/9; 725/22; 725/35

(58) Field of Classification Search ............. 725/9, 22, 725/32, 34–36, 42
See application file for complete search history.

(56) References Cited

U.S. PATENT DOCUMENTS

| | | | | |
|---|---|---|---|---|
| 5,974,299 | A | 10/1999 | Massetti | |
| 6,338,043 | B1* | 1/2002 | Miller | 705/14.69 |
| 6,505,169 | B1* | 1/2003 | Bhagavath et al. | 705/14.66 |
| 6,698,020 | B1* | 2/2004 | Zigmond et al. | 725/34 |
| 7,363,643 | B2* | 4/2008 | Drake et al. | 725/34 |
| 2002/0041648 | A1* | 4/2002 | Sakata et al. | 375/354 |
| 2002/0083443 | A1* | 6/2002 | Eldering et al. | 725/34 |
| 2002/0165773 | A1* | 11/2002 | Natsuno et al. | 705/14 |
| 2004/0111738 | A1 | 6/2004 | Gunzinger | |
| 2005/0182676 | A1* | 8/2005 | Chan | 705/14 |
| 2006/0075445 | A1* | 4/2006 | O'Kane | 725/100 |
| 2006/0253328 | A1* | 11/2006 | Kohli et al. | 705/14 |
| 2006/0287915 | A1* | 12/2006 | Boulet et al. | 705/14 |

FOREIGN PATENT DOCUMENTS

| | | |
|---|---|---|
| JP | 10-022955 A | 1/1998 |
| JP | 2001-352308 A | 12/2001 |
| JP | 2002-140613 A | 5/2002 |
| KR | 10-2005-0019417 A | 3/2005 |
| KR | 10-2005-0072971 | 7/2005 |

OTHER PUBLICATIONS

"UXP/DS ONAIR/TV4: Chapter 1: Material Management", Fujitsu. Japan, Mar. 31, 1996, p. 50-59.

* cited by examiner

*Primary Examiner* — Scott Beliveau
*Assistant Examiner* — Alexander Q Huerta
(74) *Attorney, Agent, or Firm* — Sughrue Mion, PLLC (57) ABSTRACT

A method and system are provided for allocating a dynamic advertisement according to audience ratings. The method includes selecting an advertisement broadcast to be transmitted based on broadcast viewing information of users and a transmission condition, and providing the selected advertisement broadcast.

15 Claims, 7 Drawing Sheets

| ADVERTISEMENT IDENTIFIER | TRANSMISSION CONDITION IDENTIFIER | TRANSMISSION CONDITION | | ADVERTISEMENT RATE (THOUSAND WON) |
|---|---|---|---|---|
| | | ADVERTISEMENT TIME | LOWEST AUDIENCE RATING (%) | |
| 100001 | 2865782 | N9 | 15 | 6200 |
| | 2873681 | N9 | 20 | 12000 |
| | 2876190 | N12 | 10 | 3400 |
| 100002 | 3198209 | N9 | 20 | 11400 |
| | 3187912 | N12 | 15 | 7300 |
| 100003 | 4320465 | N12 | 10 | 3600 |
| | 4320582 | N12 | 15 | 7000 |
| ... | ... | ... | ... | ... |

| ADVERTISEMENT IDENTIFIER | TRANSMISSION CONDITION | | |
|---|---|---|---|
| | ADVERTISEMENT TIME | LOWEST AUDIENCE RATING (%) | ADVERTISEMENT RATE (THOUSAND WON) |
| 100001 | N9 | 15 | 6200 |
| 100002 | N9 | 20 | 11400 |
| 100003 | N12 | 10 | 3600 |
| ... | ... | ... | ... |

FIG. 4

| ADVERTISEMENT IDENTIFIER | TRANSMISSION CONDITION IDENTIFIER | TRANSMISSION CONDITION | | |
|---|---|---|---|---|
| | | ADVERTISEMENT TIME | LOWEST AUDIENCE RATING (%) | ADVERTISEMENT RATE (THOUSAND WON) |
| 100001 | 2865782 | N9 | 15 | 6200 |
| | 2873681 | N9 | 20 | 12000 |
| | 2876190 | N12 | 10 | 3400 |
| 100002 | 3198209 | N9 | 20 | 11400 |
| | 3187912 | N12 | 15 | 7300 |
| 100003 | 4320465 | N12 | 10 | 3600 |
| | 4320582 | N12 | 15 | 7000 |
| ... | ... | ... | ... | ... |

FIG. 6

SYSTEM AND METHOD OF DYNAMICALLY ALLOCATING ADVERTISEMENT ACCORDING TO AUDIENCE RATING

CROSS REFERENCE TO RELATED APPLICATION

This application claims priority from Korean Patent Application No. 10-2006-0005951 filed on Jan. 19, 2006 in the Korean Intellectual Property Office, the disclosure of which is incorporated herein by reference in its entirety.

BACKGROUND OF THE INVENTION

1. Field of the Invention

Systems and methods consistent with the present invention relate to an advertisement broadcast, and more particularly, to allocating a dynamic advertisement according to audience ratings.

2. Description of the Related Art

Advertisement rates that are paid by advertisers to broadcasting providers for television (TV) advertisements are priced based on predictions of audience ratings when advertisement broadcasts are transmitted, based on areas where the advertisement broadcasts are transmitted, and the like. However, according to the existing method, since audience ratings are predicted by past audience ratings, it is impossible to accurately reflect real-time audience ratings when the advertisement broadcasts are transmitted and come to an agreement on the advertisement rates.

In particular, since the existing broadcasting system transmits a broadcast according to a previously scheduled broadcast schedule, it may not reflect audience ratings that dynamically change. That is, since contracts for advertisement broadcasts are made on the basis of predicted audience ratings at a previously set advertisement time, and broadcast areas, it is difficult to reflect audience ratings when advertisements are actually broadcasted. Therefore, even though the advertiser makes a contract for transmitting an advertisement broadcast that is predicted to have a high audience rating, the advertiser may not achieve expected advertising effectiveness compared with advertisement rates according to the contract because a low audience rating may be recorded when the advertisement broadcast is actually transmitted.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above The present invention provides a system and method of dynamically transmitting advertisement broadcasts according to audience ratings.

According to an aspect of the present invention, there is provided a method of allocating a dynamic advertisement that includes selecting an advertisement broadcast to be transmitted, on the basis of analysis result on broadcast viewing information of viewers and a predetermined transmission condition, and providing the selected advertisement broadcast.

According to another aspect of the present invention, there is provided a dynamic advertisement allocating system that includes an advertisement broadcast allocating server selecting an advertisement broadcast to be transmitted, on the basis of analysis result on broadcast viewing information of viewers and a predetermined transmission condition, and an advertisement broadcast providing server providing the selected advertisement broadcast.

BRIEF DESCRIPTION OF THE DRAWINGS

The above and other aspects of the present invention will become more apparent by describing in detail exemplary embodiments thereof with reference to the attached drawings, in which.

DESCRIPTION OF THE EXEMPLARY EMBODIMENTS

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of the invention are shown.

Figure 1:
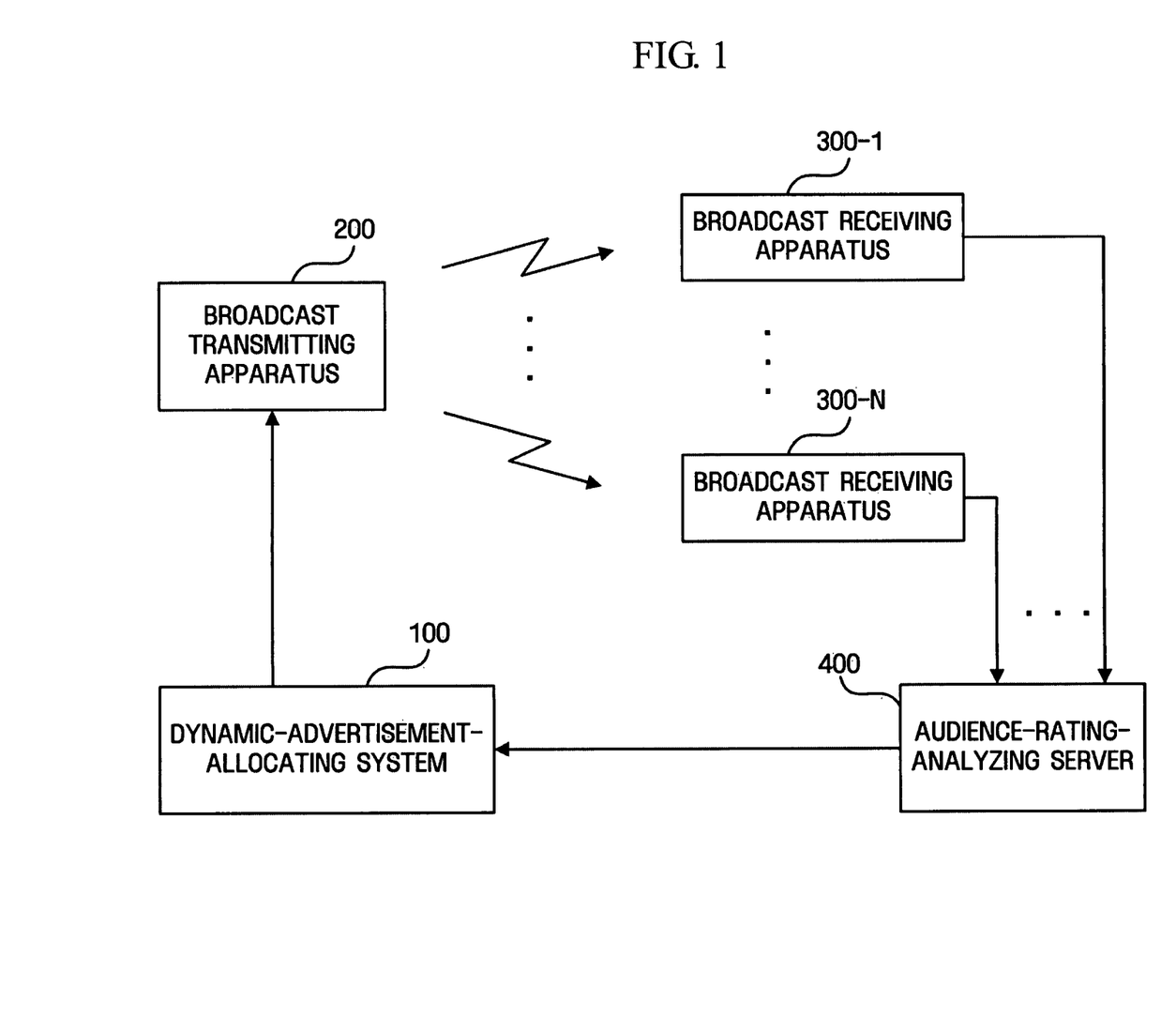
FIG. 1 is a view illustrating the concept of dynamic advertisement allocation according to a first exemplary embodiment of the present invention.

FIG. 1 is a view illustrating the concept of dynamic advertisement allocation according to a first exemplary embodiment of the present invention.

According to the first exemplary embodiment of the present invention, a dynamic advertisement allocating system 100, a broadcast transmitting apparatus 200, a broadcast receiving apparatuses 300-1 to 300-N, and an audience rating analyzing server 400 are linked with one another for dynamic advertisement allocation.

The broadcast transmitting apparatus 200 transmits regular broadcasts that are scheduled by a broadcasting provider. Further, the broadcast transmitting apparatus 200 transmits advertisement broadcasts, which are provided by the dynamic advertisement allocating system 100, between the regular broadcasts or during the regular broadcast according to the previously set broadcast schedule.

The broadcast receiving apparatuses 300-1 to 300-N receive the regular broadcasts or the advertisement broadcasts that are transmitted from the broadcast transmitting apparatus 200. The broadcast receiving apparatuses 300-1 to 300-N may be, for example, set top boxes, digital TVs, or the like. Also, the broadcast receiving apparatuses 300-1 to 300-N may be computer systems that are capable of receiving the Internet broadcasts. The regular broadcasts and the advertisement broadcasts that are received by the broadcast receiving apparatuses 300-1 to 300-N are supplied to viewers through displays and speakers.

In addition, the broadcast receiving apparatuses 300-1 to 300-N transmit viewing information of the viewer to the audience rating analyzing server 400. The broadcast receiving apparatuses 300-1 to 300-N may periodically transmit the viewing information or may transmit the viewing information whenever a channel is changed. The viewing information includes broadcasting channels that are viewed by the viewers, viewing time, and so on. The broadcast receiving apparatuses 300-1 to 300-N may have predetermined communication modules (e.g., modems) so as to transmit the viewing information. More specifically, the broadcast receiving apparatuses 300-1 to 300-N are connected to the audience rating analyzing server 400 through a cable, a telephone line, various x digital subscriber lines (xDSLs), or the like.

The audience rating analyzing server 400 collects the viewing information transmitted by the broadcast receiving apparatuses 300-1 to 300-N and measures audience ratings on the regular broadcasts or the advertisement broadcasts, which are transmitted by the broadcast transmitting apparatus 200, on the basis of the collected viewing information. The audience ratings are measured in real-time, and the measured audience ratings are provided to the dynamic advertisement allocating system 100.

The dynamic advertisement allocating system 100 stores a plurality of advertisement broadcasts. When it is time for transmission of an advertisement broadcast, the dynamic advertisement allocating system 100 searches for an advertisement broadcast, which meets a predetermined transmission condition, on the basis of an acceptable audience rating provided from the audience rating analyzing server 400, and provides the found advertisement broadcast to the broadcast transmitting apparatus 200. Therefore, type and order of the advertisement broadcasts transmitted by the broadcast transmitting apparatus 200 can dynamically change according to the audience rating and the transmission condition. The dynamic advertisement allocating system 100 will be described in detail with reference to FIG. 2.

Figure 2:
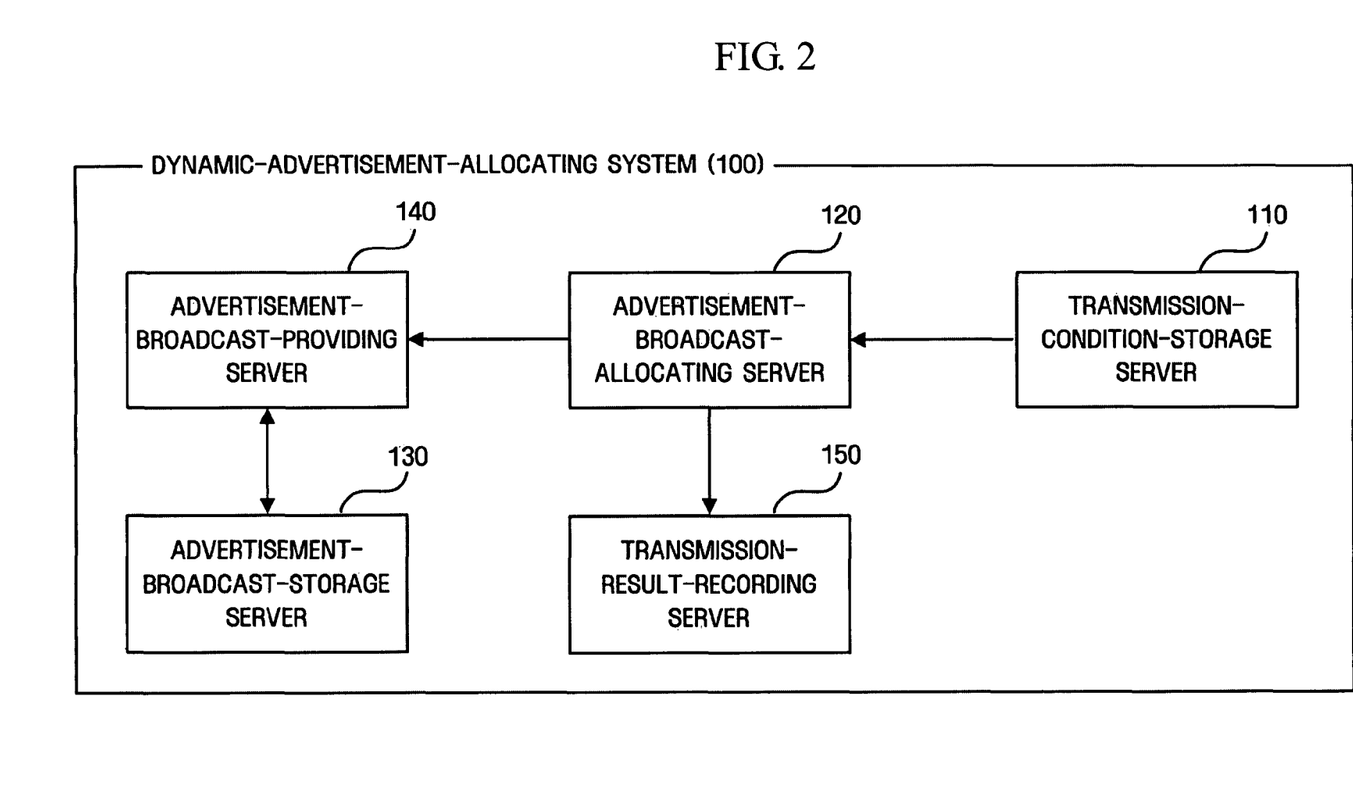
FIG. 2 is a view illustrating a dynamic advertisement allocating system according to the first exemplary embodiment of the present invention.

FIG. 2 is a view illustrating the dynamic advertisement allocating system 100 according to the first exemplary embodiment of the present invention. The dynamic advertisement allocating system 100 shown in FIG. 2 includes a transmission condition storage server 110, an advertisement broadcast allocating server 120, an advertisement broadcast storage server 130, an advertisement broadcast providing server 140, and a transmission result record server 150.

The transmission condition storage server 110 stores a transmission condition on an advertisement broadcast. The transmission condition includes an advertisement time, a lowest acceptable audience rating, advertisement rates, and the like. The transmission condition according to the first exemplary embodiment of the present invention is shown in table in FIG. 3.

Figure 3:
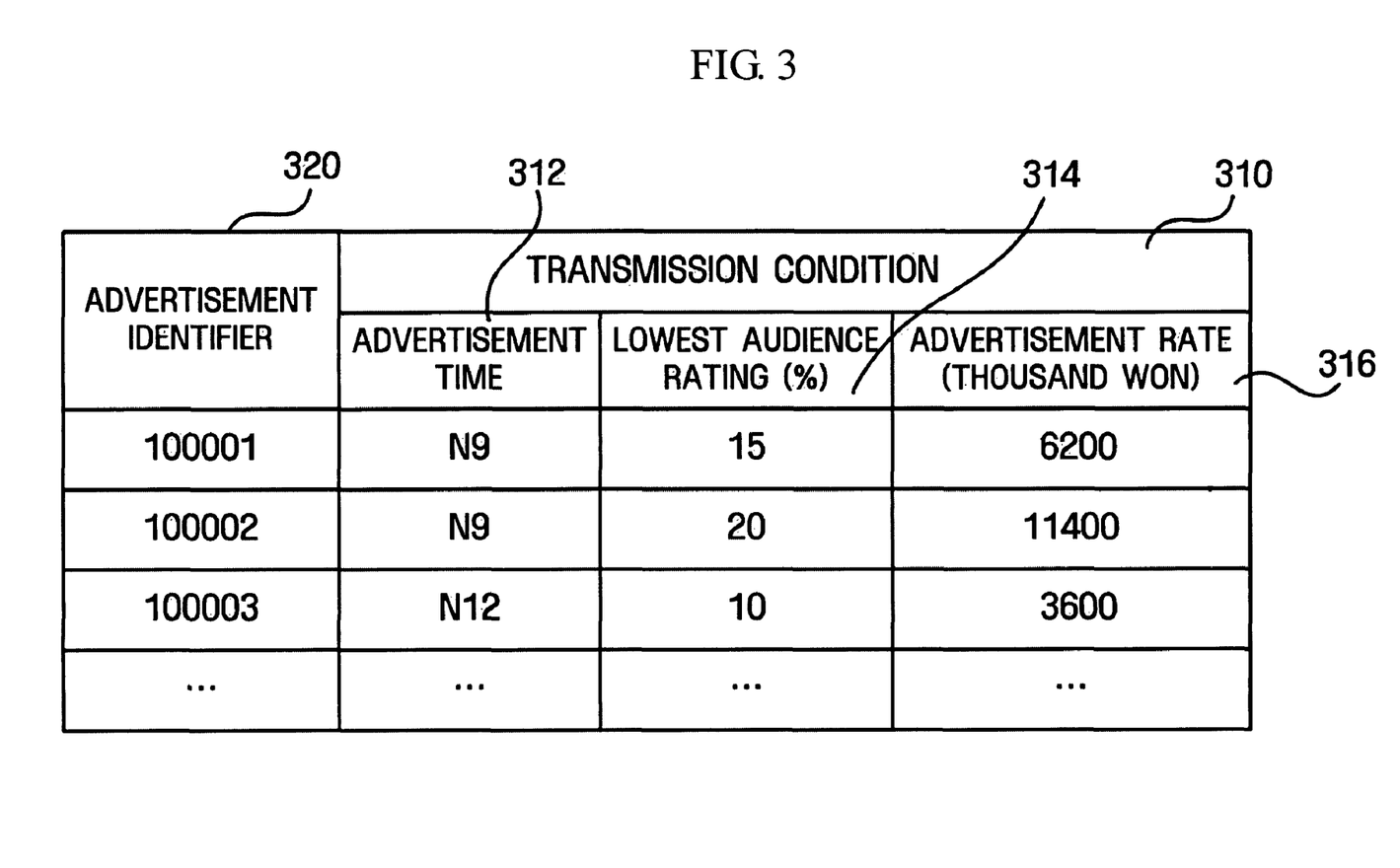
FIG. 3 is a view illustrating transmission conditions according to the first exemplary embodiment of the present invention.

FIG. 3 is a view illustrating a transmission condition 310 that is mapped to an advertisement identifier 320. In FIG. 3, the transmission condition 310 includes an advertisement time 312, a lowest acceptable audience rating 314, and advertisement rates 316, but these are not intended to limit the present invention. Therefore, the transmission condition 310 may include further information.

The advertisement identifier 320 is information for identifying an advertisement broadcast to be transmitted when the transmission condition 310 is satisfied.

The advertisement time 312 indicates transmission time of the advertisement broadcast that is desired by the advertiser. For example, information, which corresponds to time after a predetermined regular broadcast ends, time before the predetermined regular broadcast starts, or time during the predetermined broadcast, may be set as the advertisement time 312.

The lowest acceptable audience rating 314 is an audience rating of a broadcasting channel where the advertisement broadcast is transmitted that needs to be satisfied in order to transmit the advertisement broadcast. For example, in FIG. 3, in a case of an advertisement broadcast whose advertisement identifier is 100001, the advertisement broadcast can be transmitted at an advertisement time of N9 with an audience rating of 10% or more of a broadcasting channel.

When the advertisement broadcast is transmitted, the advertiser pays a broadcasting provider the advertisement rates 316. The advertisement rates 316 correspond to advertising revenue of the broadcasting provider. The advertisement rates 316 may also be a transmission condition of the advertisement broadcast. For example, when there are a plurality of advertisement broadcasts having the same transmission condition, that is, the same advertisement time and the same lowest acceptable audience rating, transmission priority is given to an advertisement broadcast that provides the highest advertisement rate 316.

Figure 4:
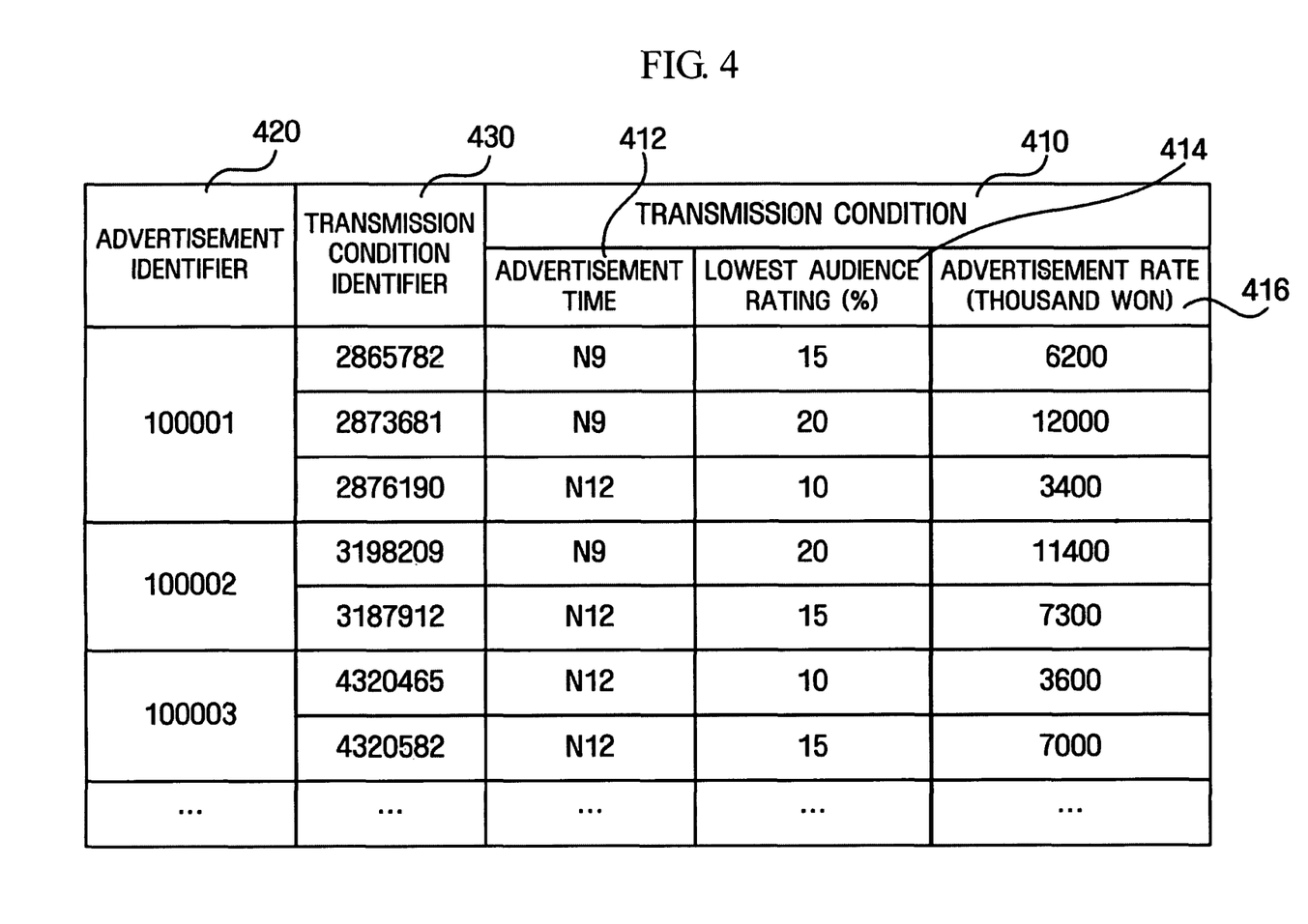
FIG. 4 is a view illustrating transmission conditions according to another exemplary embodiment of the present invention.

According to the first exemplary embodiment of the present invention, a plurality of transmission conditions can be mapped to one advertisement broadcast, and the first exemplary embodiment is shown in FIG. 4. In FIG. 4, a transmission condition identifier 430 indicates information for identifying each transmission condition. For example, in a case of an advertisement broadcast whose advertisement identifier 420 is 100001, three transmission conditions are mapped to the advertisement broadcast. Here, the transmission conditions have transmission condition identifiers 430, that is, 2865782, 2873681, 2876190. Here, the advertisement broadcast whose advertisement broadcast 420 is 100001 has advertisement transmission conditions, that is, the lowest acceptable audience ratings of 15% and 20% at an advertisement time 412 of N9. Advertisement rates 416 are differently priced according to the audience ratings. In addition, the advertisement broadcast whose advertisement identifier 420 is 100001 has transmission conditions, that is, advertisement times 412 of N9 and N12.

As such, a plurality of transmission conditions having different advertisement times may be mapped to one advertisement broadcast, or a plurality of transmission conditions having different lowest acceptable audience ratings at the same advertisement time may be mapped to one advertisement broadcast.

The transmission conditions, which have been described with reference to FIGS. 3 and 4, can be previously set according to an agreement between the advertiser and the broadcast provider.

Referring to FIG. 2, the advertisement broadcast allocating server 120 selects an advertisement broadcast to be transmitted on the basis of a real-time audience rating provided by the audience rating analyzing server 400 and a transmission condition stored in the transmission condition storage server 110.

For example, the advertisement broadcast allocating server 120 selects, as an advertisement broadcast to be transmitted, the advertisement broadcast that has a transmission condition, that is, a lowest acceptable audience rating not more than the audience rating provided by the audience rating analyzing server 400. When there are a plurality of advertisement broadcasts that have the transmission condition, that is, the lowest acceptable audience rating not more than the audience rating, the advertisement broadcast allocating server 120 finally selects the advertisement broadcast, which provides the highest advertisement rate, from the plurality of advertisement broadcasts. When the advertisement broadcast to be transmitted is selected, the advertisement broadcast allocating server 120 transmits an advertisement identifier of the selected advertisement broadcast to the advertisement broadcast providing server 140.

The advertisement broadcast storage server 130 stores a plurality of advertisement broadcasts. The advertisement broadcasts stored in the advertisement broadcast storage server 130 are mapped with their own advertisement identifiers.

The advertisement broadcast providing server 140 provides the advertisement broadcast, which is selected by the advertisement broadcast allocating server 120, to the broadcast transmitting apparatus 200. More specifically, when the advertisement identifier is transmitted by the advertisement broadcast allocating server 120, the advertisement broadcast providing server 140 searches for the advertisement broadcast, which is mapped with the transmitted advertisement identifier, from the advertisement broadcast storage server 130 and provides the searched advertisement broadcast to the broadcast transmitting apparatus 200.

The transmission result record server 150 records a transmission result of the advertisement broadcast. For example, when the advertisement broadcast, which is selected by the advertisement broadcast allocating server 120, is provided to the broadcast transmitting apparatus 200, the transmission result record server 150 stores as a transmission result, transmission information used as a basis for selection of the advertisement broadcast by the advertisement broadcast allocating server 120, that is, a transmission condition identifier, and the advertisement identifier of the selected advertisement broadcast. The stored transmission result can be used when accounts are later settled.

In the description in FIGS. 1 and 2, the audience rating analyzing server 400 is separated from the dynamic advertisement allocating system 100, but the present invention is not limited thereto. Alternatively, the audience rating analyzing server 400 may be included in the dynamic advertisement allocating system 100 as a component.

Hereinafter, the operation of the above-described dynamic advertisement allocating system 100 will be described with reference to FIG. 5.

Figure 5:
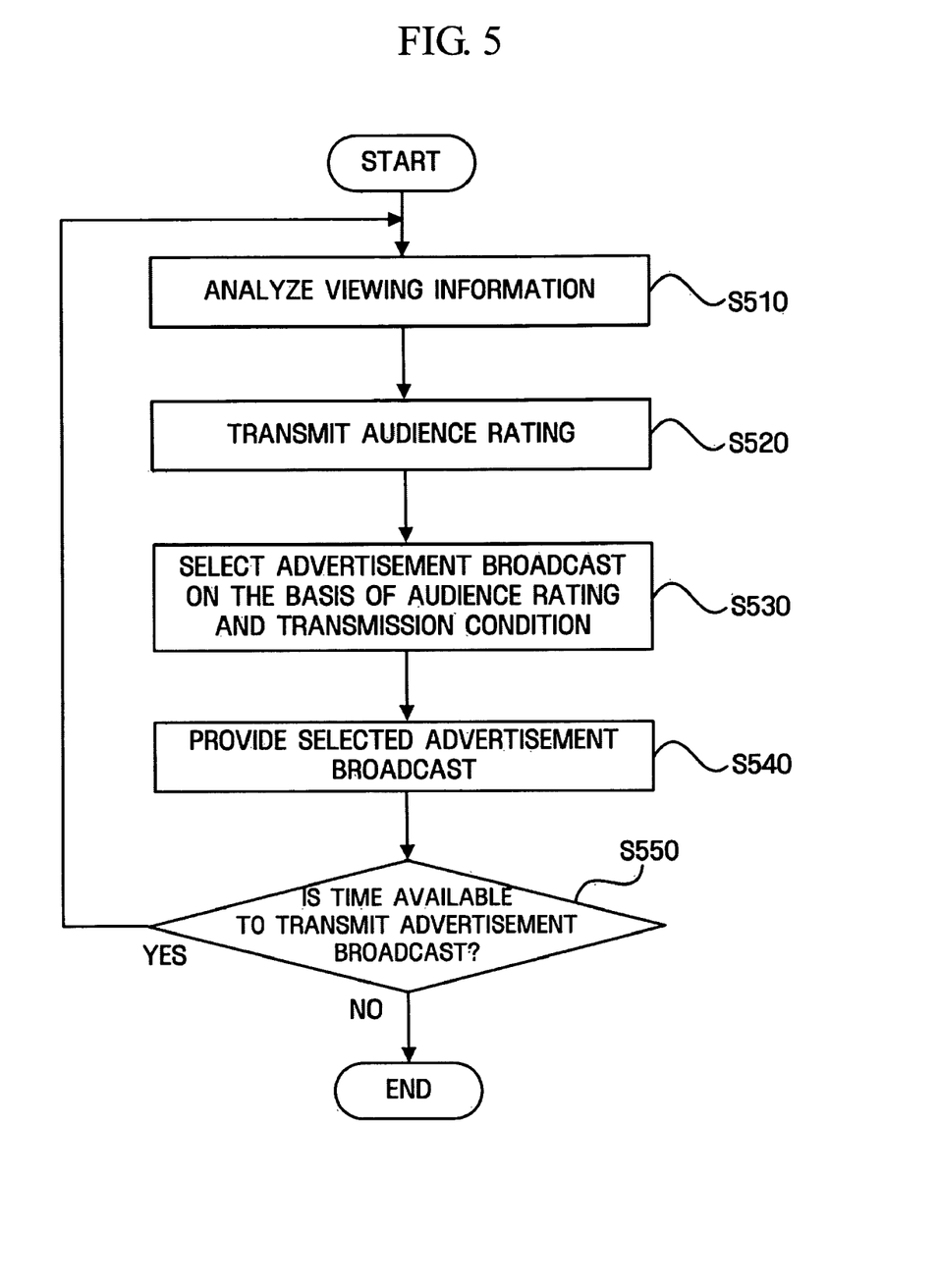
FIG. 5 is a flow chart illustrating a method of allocating a dynamic advertisement according to the first exemplary embodiment of the present invention.

FIG. 5 is a flow chart illustrating a method of allocating a dynamic advertisement according to the first exemplary embodiment of the present invention.

First, the audience rating analyzing server 400 receives audience rating information from the broadcast receiving apparatuses 300-1 to 300-N and analyzes the received audience rating information (Operation S510).

Further, the audience rating analyzing server 400 transmits an audience rating, which is obtained by the audience rating analysis, to the dynamic advertisement allocating system 100 (Operation S520). Here, the audience rating may be transmitted periodically, and thus, the dynamic advertisement allocating system 100 can obtain a real-time audience rating.

When a predetermined advertisement time arrives, the advertisement broadcast allocating server 120 of the dynamic advertisement allocating system 100 selects an advertisement broadcast to be transmitted on the basis of an audience rating provided by the audience rating analyzing server 400 and a transmission condition stored in the transmission condition storage server 110 (Operation S530). The advertisement time may previously be set according to a broadcast schedule. A detailed exemplary embodiment of a process in which the advertisement broadcast allocating server 120 selects the advertisement broadcast to be transmitted will be described below with reference to FIG. 6.

The advertisement broadcast providing server 140 searches for the advertisement broadcast, which is selected by the transmission condition storage server 110, from the advertisement broadcast storage server 130 and provides the searched advertisement broadcast to the broadcast transmitting apparatus 200 (Operation S540).

Thereafter, the advertisement broadcast allocating server 120 determines whether there is enough time to transmit the advertisement broadcast during the allocated advertisement time (Operation S550). If time to transmit the advertisement broadcast is available during the allocated advertisement time, Operations S510 to S540 may repeatedly be performed.

According to the first exemplary embodiment of the present invention, the advertisement broadcast allocating server 120 can allow an advertisement broadcast, which has already been transmitted once at the same advertisement time, not to be retransmitted at that time. For example, transmission information of the transmitted advertisement broadcast may be excluded from the operation of selecting an advertisement broadcast according to Operations S510 to S540 in FIG. 5 until the advertisement time changes.

According to a second exemplary embodiment of the present invention, the same advertisement broadcast may be transmitted at the same advertisement time a predetermined number of times. To do so, a limited number of transmissions of the advertisement broadcast at the same advertisement time may be set in the transmission condition according to an agreement between an advertiser and a broadcasting provider. In this case, the advertisement broadcast allocating server 120 counts the number of transmissions whenever the advertisement broadcast is transmitted. The transmission information of the advertisement broadcast, which was already transmitted, is not excluded from the operation of selecting an advertisement broadcast according to Operations S510 to S540 in FIG. 5 until the counted number of transmissions becomes the same as the limited number set in the transmission information.

Meanwhile, though not shown in FIG. 5, the transmission result record server 150 may store an advertisement transmission result according to advertisement transmission.

Figure 6:
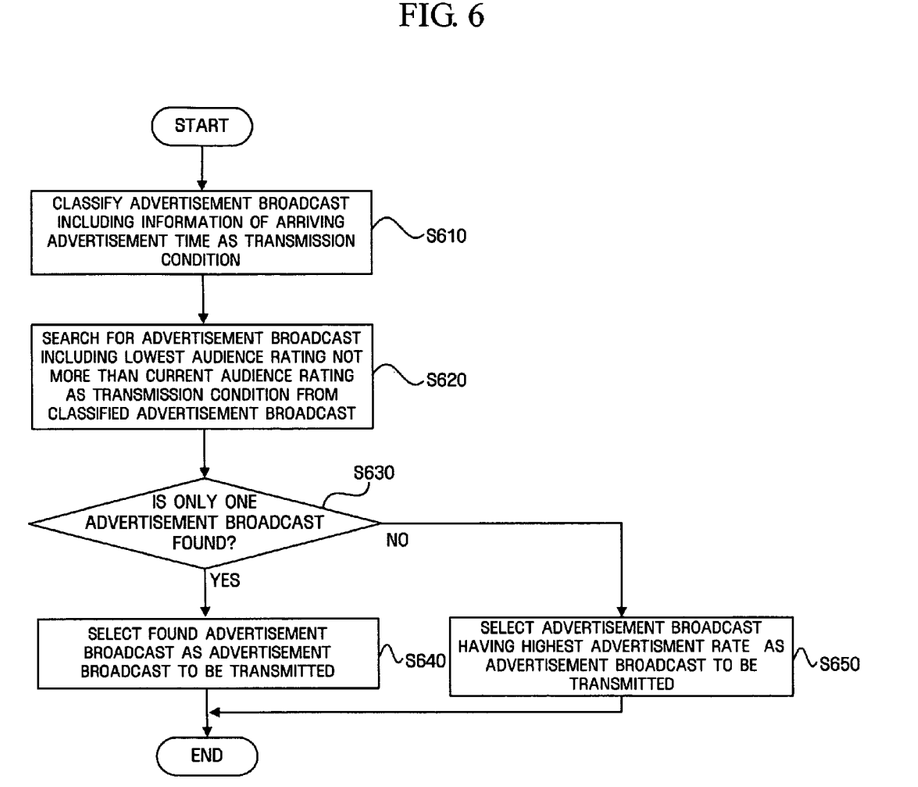
FIG. 6 is a flow chart illustrating a process of selecting an advertisement broadcast to be transmitted in accordance with the first exemplary embodiment of the present invention.

FIG. 6 is a flow chart illustrating a process of selecting an advertisement broadcast to be transmitted according to the first exemplary embodiment of the present invention. The flow chart corresponds to the detailed exemplary embodiment of Operation S530 in FIG. 5.

When a predetermined advertisement time arrives, the advertisement broadcast allocating server 120 classifies advertisement broadcasts including information on the arriving advertisement time as a transmission condition. (Operation S610).

Further, the advertisement broadcast allocating server 120 searches for an advertisement broadcast, which has a transmission condition, that is, a lowest acceptable audience rating equal to or not more than the current audience rating, from the classified advertisement broadcasts (Operation S620).

If only one advertisement broadcast is found (Operation S630), the advertisement broadcast allocating server 120 selects the found advertisement broadcast as an advertisement broadcast to be transmitted (Operation S640). At this time, the advertisement broadcast allocating server 120 transmits an advertisement identifier of the selected advertisement broadcast to the advertisement broadcast providing server 140.

Meanwhile, when a plurality of advertisement broadcasts are found as a result of the searching of Operation S620, the advertisement broadcast allocating server 120 selects as an advertisement broadcast to be transmitted, an advertisement broadcast, which has a transmission condition including the highest advertising rate, from the searched advertisement broadcasts (Operation S650). At this time, the advertisement broadcast allocating server 120 transmits an advertisement identifier of the selected advertisement broadcast to the advertisement broadcast providing server 140.

The process of transmitting an advertisement broadcast, which has been described with reference to FIGS. 5 and 6, will be understood in more detail according to a description with reference to FIG. 7.

Figure 7:
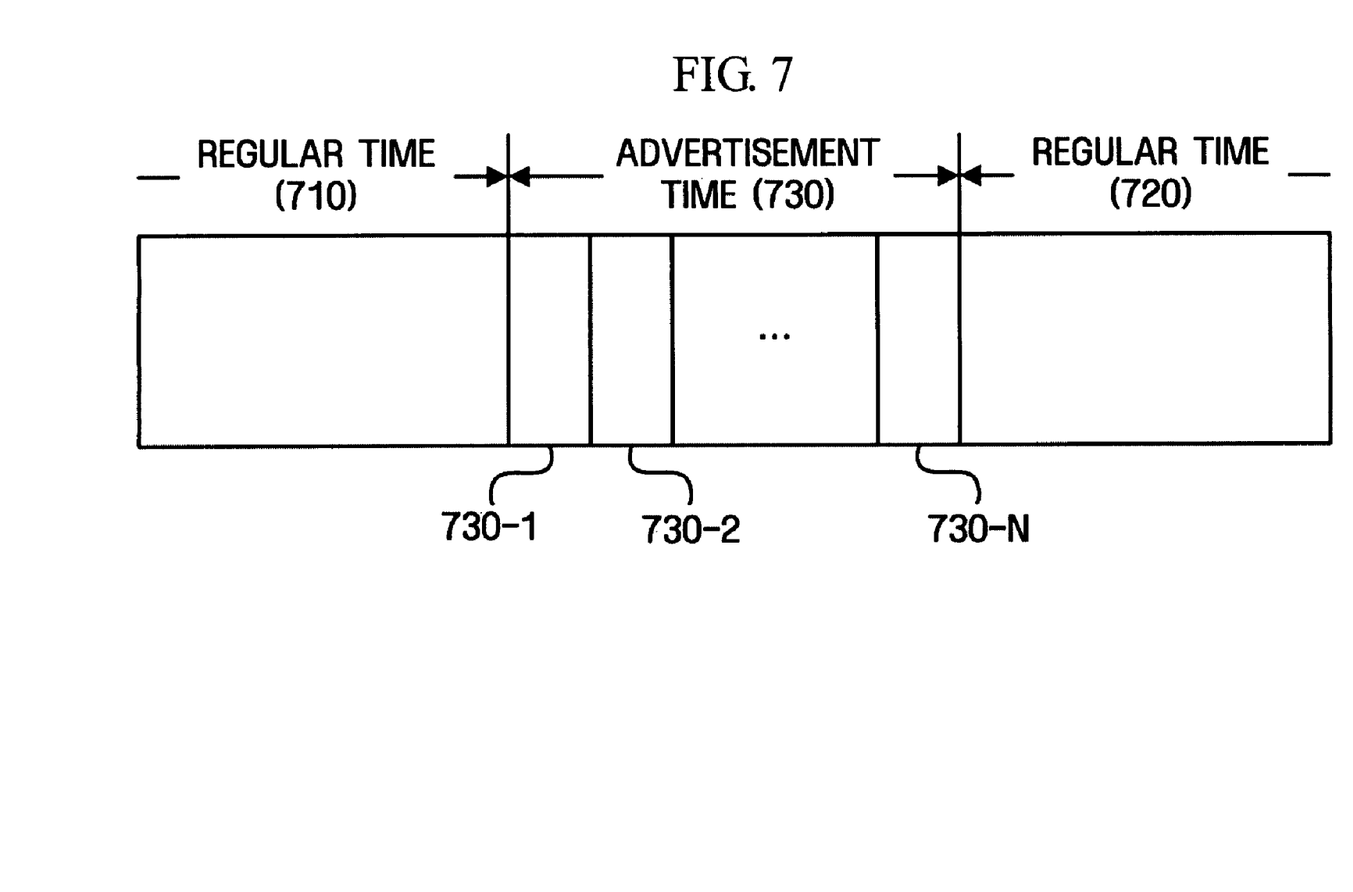
FIG. 7 is a time frame schematically illustrating transmission time of a regular broadcast and an advertisement broadcast.

FIG. 7 is a time frame schematically illustrating transmission time of a regular broadcast and an advertisement broadcast. The time frame includes regular times 710 and 720 that show transmission time of the regular broadcasts and an advertisement time 730 that shows transmission time of the advertisement broadcast.

The advertisement time 730 includes a plurality of time slots, and each of the time slots is a time zone that is assigned so as to transmit an individual advertisement broadcast. As the regular time 710 ends, an advertisement broadcast to be transmitted in a first time slot 730-1 of the advertisement time 730 needs to be selected. At this time, the advertisement broadcast allocating server 120 transmits a first advertisement broadcast on the basis of an audience rating from an end point of the regular time 710 to a point before critical time. The critical time may previously be set, in consideration of the time requested to select the advertisement broadcast on the basis of the audience rating and transmit the selected advertisement broadcast to the broadcast transmitting apparatus 200. The selected advertisement broadcast is transmitted in the first time slot 730-1.

As the first advertisement broadcast ends, an advertisement broadcast to be transmitted in a second time slot 730-2 of the advertisement time 730 needs to be selected. At this time, the advertisement broadcast allocating server 120 selects a second advertisement broadcast on the basis of an audience rating from an end point of the first time slot 730-1 to a point before critical time. The selected advertisement broadcast is transmitted in the second time slot 730-2.

The operation is repeatedly performed. When an advertisement broadcast to be transmitted in a final time slot 730-N of the advertisement time 730 is selected, the advertisement broadcast allocating server 120 waits until the next advertisement time arrives.

Although the present invention has been described in connection with the exemplary embodiments of the present invention, it will be apparent to those skilled in the art that various modifications and changes may be made thereto without departing from the scope and spirit of the invention. Therefore, it should be understood that the above exemplary embodiments are not limitative, but illustrative in all aspects.

According to the system and method of allocating a dynamic advertisement according to audience ratings of the exemplary embodiments of the present invention, it may be possible to obtain.

First, advertisement broadcasts can be dynamically transmitted according to audience ratings.

Second, the results of advertising can apply advertisement rates in an equivalent manner.

What is claimed is:

1. A method of dynamically allocating an advertisement, the method comprising:
   selecting advertisement broadcasts to be transmitted based on an analysis of broadcast viewing information of viewers and a plurality of transmission conditions; and
   providing the selected advertisement broadcasts during an advertisement time period,
   wherein the advertisement time period includes a plurality of time slots, each time slot of said plurality of time slots being a time period that is assigned for transmitting an individual advertisement broadcast, and
   wherein the selecting the advertisement broadcasts comprises:
   selecting one of the plurality of transmission conditions;
   determining whether an advertisement broadcast has already been transmitted during the advertisement time period and, if it is determined that the advertisement broadcast has already been transmitted during the advertisement time period, then excluding, from the selecting the advertisement broadcasts, transmission information of the already transmitted advertisement broadcast until the advertisement time period expires;
   selecting a first advertisement broadcast to be transmitted in a first time slot based on an audience rating from an end point of a regular broadcast time period to a point before a critical time; and
   selecting a second advertisement broadcast to be transmitted in a second time slot based on the audience rating from an end point of the first time slot to the point before the critical time,
   wherein a first one of the plurality of transmission conditions is mapped to an advertisement identifier using a first transmission condition identifier, the first one of the plurality of transmission conditions comprising:
   a first advertisement time;
   a first lowest acceptable audience rating; and
   a first advertisement rate;
   wherein a second one of the plurality of transmission conditions is mapped to the advertisement identifier using a second transmission condition identifier, the second one of the plurality of transmission conditions comprising:
   a second advertisement time that is different from the first advertisement time; and
   a second lowest acceptable audience rating that is different from the first lowest acceptable audience rating; and
   wherein the advertisement identifier identifies one advertisement broadcast.

2. The method of claim 1, wherein the broadcast viewing information comprises the audience rating, and
   wherein the first lowest acceptable audience rating is a lowest acceptable audience rating for transmission of the one advertisement broadcast.

3. The method of claim 2, wherein the selecting of the advertisement broadcasts comprises selecting an advertisement broadcast that has a lowest acceptable audience rating which is not greater than the audience rating.

4. The method of claim 3, wherein:
the first advertisement rate is a rate that an advertiser needs to pay when the one advertisement broadcast is transmitted; and
the selecting of the advertisement broadcasts comprises, if there are a plurality of advertisement broadcasts that have the lowest acceptable audience rating which is not greater than the audience rating, then selecting an advertisement broadcast that provides a highest advertisement rate from the plurality of advertisement broadcasts.

5. The method of claim 1, wherein the analysis of broadcast viewing information of viewers comprises an analysis of a real-time audience rating.

6. The method of claim 1, further comprising, if the advertisement broadcast has already been transmitted during the advertisement time period, then preventing the already transmitted advertisement broadcast from being transmitted again until the advertisement time period expires.

7. The method of claim 1, wherein a third one of the plurality of transmission conditions is mapped to the advertisement identifier using a third transmission condition identifier, the third one of the plurality of transmission conditions comprising:
the first advertisement time;
a third lowest acceptable audience rating that is different from the first lowest acceptable audience rating; and
a third advertisement rate that is different from the first advertisement rate;
wherein the first advertisement rate and the third advertisement rate are differently priced according to audience ratings.

8. The method of claim 1, wherein a third one of the plurality of transmission conditions is mapped to the advertisement identifier using a third transmission condition identifier, the third one of the plurality of transmission conditions comprising:
the first advertisement time; and
a third lowest acceptable audience rating that is different from the first lowest acceptable audience rating,
wherein the first transmission condition identifier is different from the second and third transmission condition identifiers, and the second transmission condition identifier is different from the third transmission condition identifier.

9. A dynamic advertisement allocating system comprising:
an advertisement broadcast allocating server that selects advertisement broadcasts to be transmitted based on an analysis of broadcast viewing information of viewers and a plurality of transmission conditions; and
an advertisement broadcast providing server that provides the selected advertisement broadcasts during an advertisement time period,
wherein the advertisement time period includes a plurality of time slots, each time slot of said plurality of time slots being a time period that is assigned for transmitting an individual advertisement broadcast, and
wherein the advertisement broadcast allocating server selecting the advertisement broadcasts:
selects one of the plurality of transmission conditions,
determines whether an advertisement broadcast has already been transmitted during the advertisement time period and, if it is determined that the advertisement broadcast has already been transmitted during the advertisement time period, then excludes, from the selecting the advertisement broadcasts, transmission information of the already transmitted advertisement broadcast until the advertisement time period expires,
selects a first advertisement broadcast to be transmitted in a first time slot based on an audience rating from an end point of a regular broadcast time period to point before a critical time, and
selects a second advertisement broadcast to be transmitted in a second time slot based on the second audience rating from an end point of the first time slot to the point before critical time,
wherein a first one of the plurality of transmission conditions is mapped to an advertisement identifier using a first transmission condition identifier, the first one of the plurality of transmission conditions comprising:
a first advertisement time;
a first lowest acceptable audience rating; and
a first advertisement rate;
wherein a second one of the plurality of transmission conditions is mapped to the advertisement identifier using a second transmission condition identifier, the second one of the plurality of transmission conditions comprising:
a second advertisement time that is different from the first advertisement time; and
a second lowest acceptable audience rating that is different from the first lowest acceptable audience rating; and
wherein the advertisement identifier identifies one advertisement broadcast.

10. The dynamic advertisement allocating system of claim 9, wherein the broadcast viewing information comprises the audience rating, and
wherein the first lowest acceptable audience rating is a lowest acceptable audience rating for transmission of the one advertisement broadcast.

11. The dynamic advertisement allocating system of claim 10, wherein the advertisement broadcast allocating server selects an advertisement broadcast that has a lowest acceptable audience rating which is not greater than the audience rating.

12. The dynamic advertisement allocating system of claim 11, wherein:
the first advertisement rate is a rate that an advertiser needs to pay when the one advertisement broadcast is transmitted; and
the advertisement broadcast allocating server selects, if there are a plurality of advertisement broadcasts that have the lowest acceptable audience rating which is not greater than the audience rating, an advertisement broadcast that provides a highest advertisement rate from the plurality of advertisement broadcasts.

13. The dynamic advertisement allocating system method of claim 9, wherein the analysis of broadcast viewing information of viewers comprises an analysis of a real-time audience rating.

14. The dynamic advertisement allocating system of claim 9, wherein, if the advertisement broadcast has already been transmitted during the advertisement time period, then the advertisement broadcast allocating server prevents the already transmitted advertisement broadcast from being transmitted again until the advertisement time period expires.

15. The dynamic advertisement allocating system of claim 9, wherein a third one of the plurality of transmission conditions is mapped to the advertisement identifier using a third transmission condition identifier, the third one of the plurality of transmission conditions comprising:

the first advertisement time;
a third lowest acceptable audience rating that is different from the first lowest acceptable audience rating; and
a third advertisement rate that is different from the first advertisement rate;

wherein the first advertisement rate and the third advertisement rate are differently priced according to audience ratings.

* * * * *